United States Patent [19]

Borelli, III

[11] Patent Number: 4,643,342

[45] Date of Patent: Feb. 17, 1987

[54] DUAL DRINK HOLDER FOR RECEIPT ON AN AUTOMOBILE CENTER CONSOLE

[76] Inventor: Francis J. Borelli, III, P.O. Box 275, Okarche, Okla. 73762

[21] Appl. No.: 808,550

[22] Filed: Dec. 13, 1985

[51] Int. Cl.⁴ .............................................. B60R 5/02
[52] U.S. Cl. .................................. 224/42.42; 224/148; 224/275
[58] Field of Search ................. 224/275, 311, 42.44, 224/42.42, 148, 42.45 R

[56] References Cited

U.S. PATENT DOCUMENTS

| | | | |
|---|---|---|---|
| 2,572,526 | 10/1951 | Schuessler | 224/275 X |
| 3,670,936 | 6/1972 | Pronovost et al. | 224/42.42 R |
| 4,010,696 | 3/1977 | Priesman | 224/42.42 R X |
| 4,055,286 | 10/1977 | Schmid | 224/42.42 R |
| 4,061,258 | 12/1977 | Dysart | 224/42.42 R |
| 4,097,012 | 6/1978 | McIntyre | 224/42.42 R X |
| 4,294,384 | 10/1981 | Howell | 224/42.42 R |
| 4,300,709 | 11/1981 | Page, Jr. | 224/275 |

Primary Examiner—Stephen Marcus
Assistant Examiner—Robert M. Petrik
Attorney, Agent, or Firm—Edwin H. Crabtree

[57] ABSTRACT

A dual drink holder for an automobile. The holder adapted for receipt on top of a center console. The console disposed between a driver and passenger seat. The holder is used for holding liquids such as coffee, tea, soft drinks and other articles carried in an automobile.

5 Claims, 3 Drawing Figures

DUAL DRINK HOLDER FOR RECEIPT ON AN AUTOMOBILE CENTER CONSOLE

BACKGROUND OF THE INVENTION

This invention relates to a drink holder for a vehicle and more particularly, but not by way of limitation to a dual drink holder adapted for receipt on an automobile's center console.

Heretofore, operators of fine automobile's, such as a Mercedes, quite often set a drink on or near the center console of the automobile and would inadvertently spill the drink onto the console. Because the console often houses electrical wiring, the spillage has caused the shorting out of the electrical controls and damage to the car. Until now, there has been no type of drink holder adapted for mounting on the center console to prevent the above-mentioned problem.

In the following U.S. patents; U.S. Pat. No. 3,653,567 to Selvaggio, U.S. Pat. No. 4,461,412 to Langland and U.S. Pat. No. 4,535,923 to Manke various types of container and beverage holders are described for mounting in automobiles and different types of vehicles. None of these prior art devices provide the unique features and advantages of the subject invention.

SUMMARY OF THE INVENTION

The subject dual drink holder can be quickly mounted and removed from an automobile's center console. The holder is simple in design and is readily adaptable for holding various sizes of liquid containers. Further the holder can be adapted for holding various types of articles carried in the automobile.

The drink holder holds drink containers upright during travel and prevents the inadvertent spilling of the liquid held therein onto the console, thereby eliminating any potential electrical damage to the automobile. Also the holder prevents spillage on adjoining seats and the floor of the automobile.

The invention is readily adaptable for center consoles on Mercedes, old and new D Series models, S Series, convertibles and other Mercedes models. While Mercedes is mentioned, it should be appreciated that the drink holder can also be adapted for other manufacturer's cars using a center console between the driver and passenger seat.

The dual drink holder adapted for receipt on an automobile center console includes a saddle contoured to span the width of the center console with a first and second receptacle housing attached to the ends of the saddle for receiving articles such as drink containers therein.

The advantages and objects of the invention will become evident from the following detailed description of the drawings when read in connection with the accompanying draiwings which illustrate preferred embodiments of the invention.

DETAILED DESCRIPTION OF THE DRAWINGS

Figure 1:
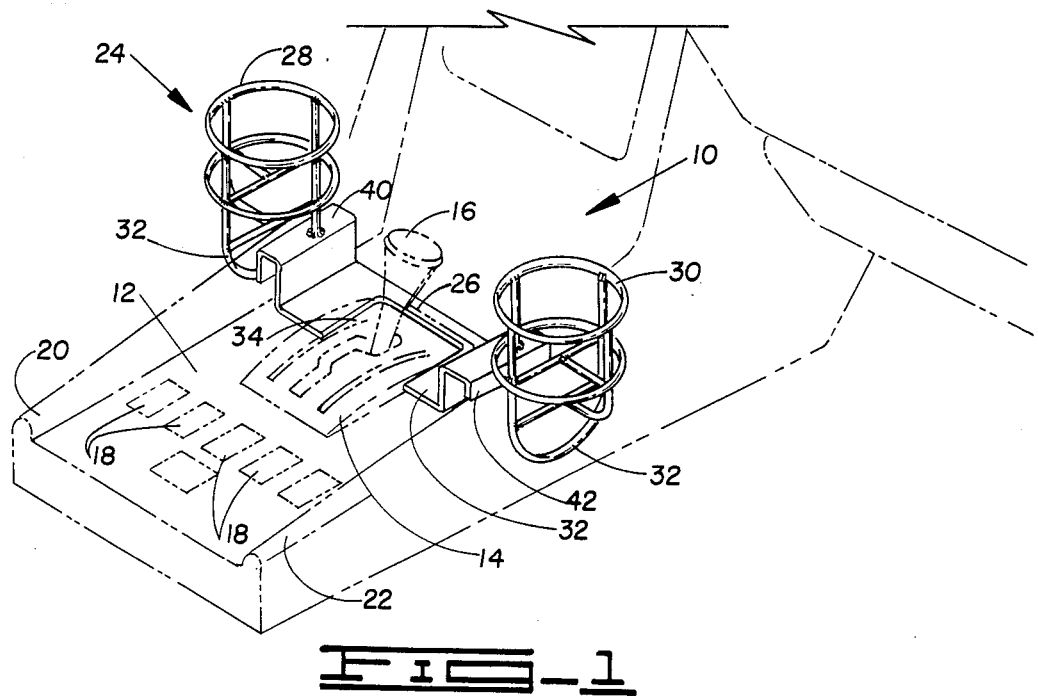
FIG. 1 illustrates a perspective view of the dual drink holder received on top of the automotobile's center console.

In FIG. 1 the interior of an automobile is shown having a center console shown in dotted lines and given general reference numeral 10. The center console 10 includes a flat center section 12 having a gear shift panel 14 centered therein with a gear shift 16. The panel 14 may or may not have a rubber boot therearound. Also shown in the center section 12 is a plurality of electrical control switches 18 which may be used for raising and lowering power windows, emergency lights, and other electrical switches.

The console 10 also includes sides 20 and 22 which extend upwardly from the opposite ends of the flat center section 12 of the console 10. The console 10 is received along a portion of the length of the automobiles and between a driver and passenger seat. The seats are not shown in the drawings.

Disposed on top of the flat center section 12 of the console 10 and engaging the sides 20 and 22 is the subject dual drink holder having general reference numeral 24. Broadly, the holder 24 includes an elongated saddle 26 for spanning the width of the console 10 and a first receptacle housing 26 and a second receptacle housing 30. The saddle 26 includes a flat horizontal center member 32 with an angular-shaped indent 34 which is contoured for receipt around the top of the gear shift panel 14. In some models of automobiles, the indent 34 may be slidably received underneath a rubber boot disposed around the panel 14.

The receptacle housings 28 and 30 while in a wire frame construction, may be made in various geometric configurations for receiving drink containers such as coffee, tea, soft drinks and the like. Also, the housing may be constructed of a solid frame for holding keys, cigarettes, maps and other various articles.

Figure 3:
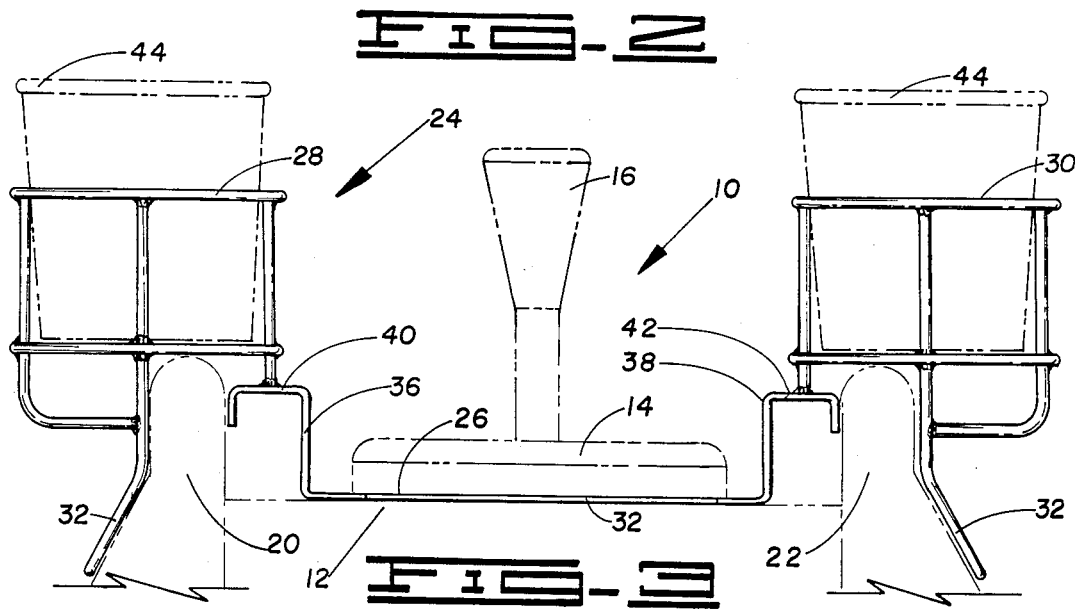
FIG. 3 illustrates a side view of the drink holder.

Referring now to both FIG. 1 and FIG. 3, the two housings 28 and 30 include downwardly extending arms 32 which are used for engaging the exterior of the upwardly extending sides 20 and 22 of the console 10. Further, it should be mentioned that the angular-shaped indent 34 by its configuration and receipt around panel 14 helps prevent any other movement, during the automobile's operation.

Figure 2:
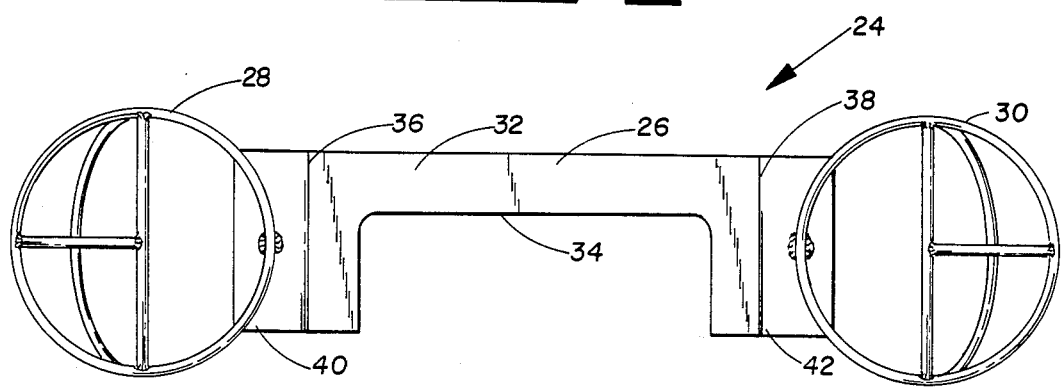
FIG. 2 illustrates a top view of the drink holder.

In FIGS. 2 and 3, the saddle 26 can be seen having a U-shaped configuration with the horizontal center member 32 having integrally formed, upwardly extending vertical side members 36 and 38. Formed at the top of the side members 36 and 38 are L-shaped end members 40 and 42.

In FIG. 3 the L-shaped members 40 and 42 can be seen engaging the interior of the upwardly extending sides 20 and 22 of the console 10. The engagement of the members 40 and 42 and arms 32 of the console's sides 20 and 22 provide a press fit of the holder 24. Also shown in FIG. 3 is a pair of cups 44 received in the housing 28 and 30 and shown in dotted lines.

From reviewing the above drawings it can be seen that the dual drink holder 24 is readily adaptable for various types of automobile center consoles for releasable engagement thereon. It should also be mentioned that the receptacle housing 28 and 30 may be made of various sizes as required along with the saddle 26 made of various lengths and widths so it can be conformed to different types of center consoles without departing from the spirit and scope of the invention. Further the holder 24 may be made of metal, plastic or any other similar material for ease in construction and durability.

Changes may be made in the construction and arrangements of the parts or elements of the embodiments as described herein without departing from the spirit or scope of the invention defined in the following claims.

What is claimed is:

1. A dual drink holder for receipt on an automobile center console having a flat center portion and opposite upwardly extending sides, the console disposed between a driver and passenger seat, the holder comprising:
   a saddle having a flat center member for receipt on top of the center portion of the console and upwardly extending side members disposed adjacent the sides of the console, the saddle having an angular-shaped indent in the center member for receipt around a portion of a gear shift panel in the center console
   a first receptacle housing cylindrical in shape and attached to one end of the saddle for receiving an article or container therein; and
   a second receptacle housing cylindrical in shape and attached to the other end of the saddle for receiving an article or container therein.

2. The holder as described in claim 1 wherein the first and second housings include a downwardly extending arm for engaging the sides of the center console and preventing lateral movement of the holder.

3. The holder as described in claim 2 wherein the side members of the saddle and the downwardly extending arms attached to the housings are received on opposite sides of the upwardly extending sides of the console in a press fit for holding the drink holder thereon.

4. A dual drink holder adapted for receipt on an automobile center console, the console disposed between a driver and passenger seat, the holder comprising:
   a saddle contoured to span the width of the center console, the saddle including an angular-shaped indent adapted for receipt around a gear shift panel in the center console;
   a first receptacle housing attached to one end of the saddle for receiving an article or container therein; and
   a second receptacle housing attached to the other end of the saddle for receiving an article or container therein.

5. A dual drink holder adapted for receipt on an automobile center console, the console disposed between a driver and passenger seat, the holder comprising:
   a saddle contoured to span the width of the center console, the saddle being "U"-shaped and having a center member for receipt on top of the center console and upwardly extending side members for engaging the side of the console;
   a first receptacle housing attached to one end of the saddle for receiving an article or container therein; and
   a second receptacle housing attached to the other end of the saddle for receiving an article or container therein.

* * * * *